United States Patent
Regoli et al.

(10) Patent No.: US 10,267,710 B2
(45) Date of Patent: Apr. 23, 2019

(54) METHOD AND APPARATUS FOR DETECTING DEFECTS ON TYRES IN A TYRE PRODUCTION PROCESS

(71) Applicant: PIRELLI TYRE S.P.A., Milan (IT)

(72) Inventors: Fabio Regoli, Bologna (IT); Vincenzo Boffa, Milan (IT); Luigi Di Stefano, Bologna (IT); Valeriano Ballardini, Turin (IT); Giuseppe Casadio Tozzi, Bologna (IT)

(73) Assignee: PIRELLI TYRE S.P.A, Milan (IT)

( * ) Notice: Subject to any disclaimer, the term of this patent is extended or adjusted under 35 U.S.C. 154(b) by 134 days.

(21) Appl. No.: 15/105,208

(22) PCT Filed: Dec. 22, 2014

(86) PCT No.: PCT/IB2014/067209
§ 371 (c)(1),
(2) Date: Jun. 16, 2016

(87) PCT Pub. No.: WO2015/097635
PCT Pub. Date: Jul. 2, 2015

(65) Prior Publication Data
US 2016/0320265 A1    Nov. 3, 2016

(30) Foreign Application Priority Data

Dec. 23, 2013  (IT) .............................. MI2013A2198

(51) Int. Cl.
*G01M 17/02* (2006.01)
*G05B 19/41* (2006.01)
(Continued)

(52) U.S. Cl.
CPC ....... *G01M 17/027* (2013.01); *G01B 11/0608* (2013.01); *G05B 19/41875* (2013.01); *G05B 2219/32368* (2013.01)

(58) Field of Classification Search
CPC ...... B29D 2030/0066; G05B 19/41875; G05B 2219/32368; G01B 11/0608; G01M 17/027
(Continued)

(56) References Cited

U.S. PATENT DOCUMENTS 6,615,650 B2 * 9/2003 Mahner .............. G01M 17/027
                                                              73/146
7,012,701 B2 * 3/2006 Hassler ................. G01B 11/25
                                                              356/601
(Continued)

FOREIGN PATENT DOCUMENTS

CN    101825444    9/2010
CN    102958686    3/2013
(Continued)

OTHER PUBLICATIONS

International Search Report from the European Patent Office for International Application No. PCT/IB2014/067209, dated Feb. 27, 2015.
(Continued)

*Primary Examiner* — Michael J Brown
(74) *Attorney, Agent, or Firm* — Finnegan, Henderson, Farabow, Garrett & Dunner, L.L.P.

(57) ABSTRACT

A method for detecting defects on tires in a tire production process includes providing a tire; acquiring a three-dimensional image of a surface portion of the tire; generating, as a function of the acquired image, a plurality of values indicating the measure of a height profile of the surface portion of the tire; calculating, as a function of the plurality of values of the measure of the height profile and according to a consensus interpolation, a plurality of values indicating an estimation of a reference height profile of the surface portion of the tire; calculating, as a function of the plurality of values of the measure of the height profile and of the
(Continued)

estimation of the reference height profile, a height profile of possible defects in the surface portion of the tire; and comparing values of the height profile of possible defects with respect to a threshold value in order to detect possible defects in the surface portion of the tire.

15 Claims, 11 Drawing Sheets

(51) Int. Cl.
  *G01B 11/06* (2006.01)
  *G05B 19/418* (2006.01)
(58) Field of Classification Search
  USPC .......................................................... 700/110
  See application file for complete search history.

(56) References Cited

U.S. PATENT DOCUMENTS

| | | | |
|---|---|---|---|
| 9,111,348 B2* | 8/2015 | Amma | ................... G06T 7/0046 |
| 2001/0052259 A1 | 12/2001 | Mahner | |
| 2005/0259859 A1 | 11/2005 | Hassler et al. | |
| 2011/0246128 A1 | 10/2011 | Nicholson et al. | |
| 2014/0283591 A1 | 9/2014 | Takahashi et al. | |

FOREIGN PATENT DOCUMENTS

| | | |
|---|---|---|
| JP | 2011-127930 | 6/2011 |
| JP | 2013-96972 | 5/2013 |
| WO | WO 2012/143197 | 10/2012 |
| WO | WO 2013/069389 | 5/2013 |

OTHER PUBLICATIONS

Notification of the First Office Action dated Feb. 2, 2018, from the State Intellectual Property Office of the People's Republic of China, in counterpart Chinese Application No. 201480075687.3.

Guorong, P. et al., "Fitted Plane Automatic Extraction Algorithm of 3-D Laser Scanning", Journal of Tongji University, Natural Science, vol. 37, No. 9, Sep. 2009.

Huangfu, Z. et al., "Parameters extraction of rotational surface based on RANSAC algorithm", Computer Engineering and Design, vol. 30, No. 5, Mar. 2009.

Jie, L., "Detecting Tire Tread Morphology Based on Laser Triangulation", Chinese Master's Dissertations, 52 pages, Feb. 2010.

Notification of Second Office Action by the State Intellectual Property Office of the People's Republic of China in counterpart Chinese Patent Application No. 2014-80075687.3, dated Nov. 1, 2018.

"Efficient RANSAC for Point-Cloud Shape Detection", Ruven Schnabel et al., Computer Graphics Forum, vol. 26 No. 2, pp. 214-226, Jun. 30, 2007.

* cited by examiner

METHOD AND APPARATUS FOR DETECTING DEFECTS ON TYRES IN A TYRE PRODUCTION PROCESS

CROSS-REFERENCE TO RELATED APPLICATIONS

This application is a national phase application based on PCT/IB2014/067209, filed Dec. 22, 2014, and claims the priority of Italian Patent Application No. MI2013A002198, filed Nov. 23, 2013, the content of each application being incorporated herein by reference.

TECHNICAL FIELD OF THE INVENTION

The present invention relates to a method and an apparatus for detecting defects on tyres, in particular defects that generate an alteration of the height profile of a surface of the tyre.

PRIOR ART

In the scope of tyre production processes, the need has been perceived to perform quality controls on the tyres themselves, in order to prevent defective tyres from being placed on the market and in a manner so as to progressively regulate the employed machinery, optimizing the execution of the operations carried out in the production process.

Known quality controls include, for example, those performed by specialized human operators who dedicate a pre-established time (for example comprised between 30 seconds and 60 seconds) for performing a visual and tactile analysis of the tyre. If the operator, in light of his experience and sensitivity, suspects that the tyre does not meet a specific quality standard, the tyre itself is discarded from the production line and is subjected to further more in-depth controls, which can take place by means of a human operator and/or via suitable equipment.

The international patent application having publication number WO 2012-143197 describes a method for processing the three-dimensional digital image of the surface of a tyre. A three-dimensional image of the surface of the tyre is acquired, in which each pixel of the image has a value in gray scale proportional to the height of the corresponding point with respect to the surface to be analysed. The method comprises the step of identifying zones of the surface to be analysed that comprise pixels having values in gray scale less than a threshold; it comprises the step of determining the boundaries of a selection rectangle comprising one or more zones of pixels having values in gray scale less than a threshold; it comprises the step of assigning, inside the selection rectangle, to each of the pixels having a value in gray scale less than the threshold, a value in gray scale equal to the average of the gray scale value of a set of reference pixels positioned in a zone in the immediate vicinity of the considered pixel.

SUMMARY OF THE INVENTION

In the scope of tyre controls, the Applicant has set the problem of detecting the possible presence of defects that generate an alteration of the height profile of a surface of the tyre, by means of optical acquisition of digital images and their subsequent processing. The Applicant has observed that for the control to be employed "in line" inside a tyre production plant, it is necessary that the control itself be precise, but at the same time executed in limited times and with limited cost. In such context, the computation requirement of the processing algorithms plays a crucial role, since when it is excessive the control times are unacceptably lengthened and/or the necessary calculation capacity renders the control impracticable.

The detection of the presence of the above mentioned defects could be carried out by means of the comparison between the tyre to be subjected to the control and a defects-free reference model.

The Applicant has however observed that such comparison is complicated and/or not very reliable due to the non-negligible variation of the tyre size, due for example:

- to the deformability of the tyre, above all when it is deflated;
- to the radial variation (referred in English as "radial runout") of the circular shape of the tyre with respect to a perfect circle;
- to the lateral variation (referred in English as "lateral runout") of the points of the sidewall of the tyre.

The Applicant has also detected that in many cases, the size of the defects to be detected are of the same order of magnitude as the above-indicated variations of the tyre and hence it is possible that false defects are detected.

Consequently, the height profiles of two defects-free tyres, of the same measure and of the same type, are very different from each other: it is thus very complicated (or even impossible) to carry out the comparison with the reference model.

In the present description, by "digital image" it is intended a set of data, typically contained in a computer file, in which each coordinate of a finite set (typically two-dimensional or in general matrix, e.g. N lines×M columns) of spatial coordinates (each typically corresponding to a pixel) is associated with a corresponding set of numeric values. For example, in the monochromatic images (like those in gray levels), such set of values coincides with a single value in a finite scale, such value being representative of the brightness (or intensity) level of the respective spatial coordinate, while in the colour images the set of values represents the brightness level of fundamental colours (e.g. in the RGB colour model, red, green and blue, while in the CMYK coding, cyan, magenta, yellow and black).

In addition, in the present description, by three-dimensional image it is intended a digital image in which each pixel is associated with surface altitude information, e.g. obtained with laser triangulation.

The Applicant has found that by using a method of consensus interpolation for calculating a reference height profile of surface portions of a tyre to be analysed, it is possible to detect with precision and processing simplicity the presence (or lack thereof) of the above mentioned defects in such surface portions of the tyre, without requiring the use of an ideal reference model defined ahead of time for a certain tyre type. Said consensus interpolation is such to identify which points of a measured height profile contribute to generating the reference height profile and which points instead do not contribute thereto.

In particular, by means of the consensus interpolation, an analysis is carried out at the local level of the tyre to be analysed: the Applicant has found that these local analyses are not affected by the variations that a tyre sustains overall (such as the runout), i.e. they are capable of filtering the effect of said variations. Consequently, by means of said local analyses, it is possible to calculate the correct height profiles of the portions, and it is therefore possible to construct a correct reference height profile of the entire tyre, as well as compare it with the measured height profile.

On the basis of a first aspect, the invention relates to a method for detecting defects on tyres in a tyre production process. The method comprises:

a) providing a tyre;
b) acquiring a three-dimensional image of a surface portion of the tyre;
c) generating, as a function of the acquired image, a plurality of values indicating the measure of a height profile of the surface portion of the tyre;
d) calculating, as a function of the plurality of values of the measure of the height profile and according to a consensus interpolation, a plurality of values indicating an estimation of a reference height profile of the surface portion of the tyre;
e) calculating, as a function of the plurality of values of the measure of the height profile and of the estimation of the reference height profile, a height profile of possible defects in the surface portion of the tyre;
f) comparing values of the height profile of possible defects with respect to a threshold value in order to detect possible defects in the surface portion of the tyre.

On the basis of a second aspect, the invention relates to an apparatus for detecting defects on tyres in a tyre production line. The apparatus comprises:

a support and movement member having a support adapted to support the tyre and to rotate it around a rotation axis thereof;

a light source configured to emit a light radiation for illuminating a portion of the surface of the tyre during its rotation;

at least one camera configured to acquire a three-dimensional image of the surface portion of the tyre during its rotation;

a processing unit configured to:
generate, as a function of the acquired image, a plurality of values indicating the measure of a height profile of said surface portion of the tyre;

calculate, as a function of the plurality of values of the measure of the height profile and according to a consensus interpolation, a plurality of values indicating an estimation of a reference height profile of the surface portion of the tyre;

calculate, as a function of the plurality of values of the measure of the height profile and of the estimation of the reference height profile, a height profile of possible defects in the surface portion of the tyre;

compare values of the height profile of possible defects with respect to a threshold value in order to detect possible defects in the surface portion of the tyre.

More particularly, the consensus interpolation generates a line (not necessarily rectilinear) that crosses through most of the values which correspond to points of the considered portion that does not have the defect, i.e. most of the values that correspond to points of the considered portion having the defect are discarded. Preferably, the line is a parabola or a spline.

Preferably, the calculation of the height profile of possible defects (step e) of the method) is performed with a difference between the values of the measure of the height profile and the respective values of the estimation of the reference height profile.

The Applicant has found that it is particularly advantageous to use a consensus interpolation of RANdom SAmple Consensus type, which will be abbreviated hereinafter with RANSAC. The RANSAC algorithm carries out a local interpolation of a plurality of values representative of the acquired image of a surface portion of the tyre. In particular, said interpolation generates a straight line that crosses through most of the values corresponding to points of the considered portion that does not have the defect, as will be explained in more detail below; in other words, most of the values corresponding to points of the considered portion having the defect are discarded. The RANSAC algorithm is iterative and is particularly effective since it requires a limited number of iterations.

The limited number of iterations allows to analyse a portion of a tyre in a limited time period and thus it allows performing a complete analysis of the surface portion of the tyre in a continuous tyre production line, i.e. without stopping the tyre manufacturing process.

The method and apparatus can be used for detecting defects on surface portions of the carcass of the finished tyre, i.e. a portion of the internal surface of the finished tyre; still in other words, the internal surface of the finished tyre is the one which is opposite the mounting rim when the finished tyre is mounted thereon. Therefore in this case the portion of the finished tyre is a portion of the carcass of the finished tyre and the threshold value is selected in a manner so as to be greater than the maximum value of the height of reliefs or depressions present on the surface of the carcass, in a manner so as to prevent that these are considered defects.

In another example, the portion of the finished tyre on which the analysis is carried out is a portion of the bead of the finished tyre.

In a further example, the method and apparatus are used for detecting defects on portions of the surface of the tread of the finished tyre, thus the portion of the tyre is a portion of the surface of the tread of the finished tyre, such as for example:

the surface of a groove that extends around the rotation axis of the tyre along a part of the circumferential surface defined by the tread of the finished tyre;

the surface of a groove that extends around the rotation axis of the tyre along the entire circumferential surface defined by the tread of the finished tyre;

the surface of a block that extends around the rotation axis of the tyre along a part of the circumferential surface defined by the tread of the finished tyre and which does not have indentations;

the surface of a block that extends around the rotation axis of the tyre along the entire circumferential surface defined by the tread of the finished tyre and which does not have indentations.

The analysis can be also carried out in the case wherein the tread of the finished tyre is substantially slick (e.g. in the case of slick tyres used in the sports/racing field), and thus the method and apparatus are used for detecting defects on portions of the surface of the slick tread of the finished tyre.

In a further variant, the tyre to be analysed can be a green tyre, i.e. a tyre which has not yet been subjected to curing in the producing process. For example, the external crown surface of the green tyre (i.e. in the tread zone) can be subjected to analysis, such surface does not have the tread pattern and thus it is substantially slick.

With reference to a portion of the tyre that extends around the rotation axis of the tyre along a part or along the entire circumferential surface defined by the finished tyre (such as the surface of the carcass, the surface of a groove or of a block of the tread) or green tyre (such as its external surface), the Applicant has found advantageous to subdivide the circumferential surface of said portion into a plurality of arc-shaped sections, wherein multiple contiguous arc-shaped sections are at least partially overlapped on each other two-by-two in the circumferential direction, i.e.

around the rotation axis of the tyre: in this manner the probability of committing errors of estimation of the reference height profile (e.g. in the case wherein a defect extends between two contiguous arc-shaped sections) is reduced, because a part of the acquired data is used two or more times in successive estimations.

The above-described method for detecting defects is iteratively repeated over all the arcs. For example, in the case of two arcs, the defect detection method comprises one or more of the following:

in step b), generating a first three-dimensional image of a first arc-shaped section and a second three-dimensional image of a second arc-shaped section, wherein the second arc-shaped section is at least partially overlapped on the first arc-shaped section;

in step c), generating, as a function of the first image, a first plurality of values indicating the measure of a first height profile of the first arc-shaped section and generating, as a function of the second image, a second plurality of values indicating the measure of a second height profile of the second arc-shaped section;

in step d):
calculating, as a function of the first plurality of values and according to said consensus interpolation, a first estimation of the reference height profile of the first arc-shaped section;
calculating, as a function of the second plurality of values and according to said consensus interpolation, a second estimation of the reference height profile of the second arc-shaped section;

in step e):
calculating a first height profile of possible defects in the first arc-shaped section by means of the difference between the first measured height profile and the first estimation of the reference height profile;
calculating a second height profile of possible defects in the second arc-shaped section by means of the difference between the second measured height profile and the second estimation of the reference height profile;

in step f), comparing values representative of the first height profile of possible defects and values representative of the second height profile of possible defects with respect to the threshold value in order to detect possible defects in the first arc-shaped section and in the second arc-shaped section.

The Applicant has also found advantageous to subdivide the width of the surface of the portion to be analysed into a plurality of substantially annular bands which extend around the rotation axis of the tyre along a part or along the entire circumferential surface to be analysed and have a substantially constant width: in this manner, it is possible to speed up the acquisition of the images and the processing of the acquired images, in a manner so as to allow the in-line control of the tyre. Therefore, considering in particular the method, this further comprises subdividing the width of the surface of said portion into a plurality of substantially annular bands having a substantially constant width, and repeating the steps b)-f) for each band of the plurality of bands.

Preferably, two contiguous bands are at least partially circumferentially overlapped on each other, i.e. they are overlapped in the direction defined by the tangent to the circumferential surface of the bands.

Preferably, the portion to be analysed extends around the rotation axis of the tyre along the entire circumferential surface of the finished tyre (such as, for example, in the case of the carcass, of a groove or of a block of the tread) or of the green tyre (such as for example the external surface at the tread) and thus the plurality of bands extends around the rotation axis of the tyre along the entire circumferential surface of the finished or green tyre.

The Applicant has also observed that a tyre to be analysed can comprise variations of the height profile that are not caused by defective elements, but are caused by expected elements. Such expected elements can or can not be positioned in the same position for a specific tyre type.

For example, among the elements that are not always positioned in the same position for a specific tyre type, there can be the following:
overlapping on the carcass;
decorations on the carcass;
tread wear indicators (TWI) within grooves of the tread.

Among the expected elements that are substantially positioned in the same position, there can be the following, for example:
indentations of the tread;
tread wear indicators (TWI) within grooves of the tread;
writing on the sidewall of the tyre;
carcass overlapping and decorations;
building or preparation ply joints, or liner joints.

Advantageously, the method and apparatus for detecting defects allow to take into account said expected elements, in a manner so as to prevent them from being considered defects.

This can be obtained by using previously-known geometric information for a specific tyre type.

Therefore with reference to the defect detection method, this can further comprise:
receiving a configuration height profile of a portion of the tyre indicating the position of expected elements on the surface portion of the tyre;
comparing the height profile of possible defects with respect to the configuration height profile, so as to remove said expected elements from the height profile of possible defects.

The above mentioned configuration height profile can be obtained by using a finished reference tyre (i.e. defects-free), and applying the above described consensus estimation algorithm (e.g. RANSAC) on the considered portion of a surface of such finished reference tyre.

In this manner, the method and apparatus of the invention allow to detect defects also on a portion of a surface of the finished tyre which is not substantially slick, such as:
the surface of the tread having a specific pattern in relief;
the surface of a groove of the tread having one or more tread wear indicators;
the surface of the sidewall having specific writing in relief;
the surface of the carcass having non-negligible overlapping or decorations;
the surface of the carcass having overlapping or decorations;
the surface of the bead.

In order to eliminate possible high-frequency noise from the measured height profile, the method can further comprise carrying out a filtering (e.g. of gaussian type) of the data representative of the acquired image and/or of the measured height profile.

Preferably, as an alternative to the RANSAC algorithm, the consensus interpolation is selected from among one of the following interpolation algorithms:
PROgressive SAmple Consensus—PROSAC;
randomised RANSAC;

progressive RANSAC;
Maximum Likelihood EStimation SAmple Consensus—MLESAC;
MAPSAC;
N Adjacent Points random consensus—NAPSAC;
IMPortance SAmpling Consensus—IMPSAC;
robust filtering by consensus—KALMANSAC.

On the basis of a third aspect, the invention relates to a computer program comprising software code portions adapted to perform at least the steps c), d), e), f) of the method according to the first aspect of the invention, when said program is run on at least one computer.

On the basis of a fourth aspect, the invention relates to a process for producing tyres. The process comprises the operations of:
building green tyres;
moulding and curing the green tyres;
controlling the green tyres and/or the cured tyres according to the method of the first aspect of the invention.

On the basis of a fifth aspect, the invention relates to a tyre production line. The line comprises:
a working station;
a moulding and curing station;
a control station comprising an apparatus to detect defects on the tyres exiting from said working station and/or from said moulding and curing station based on the second aspect of the invention.

BRIEF DESCRIPTION OF THE DRAWINGS

Further characteristics and advantages of the invention will be clearer from the following description of a preferred embodiments and variants thereof provided by way of example with reference to the enclosed drawings, wherein.

DETAILED DESCRIPTION OF THE INVENTION

It is observed that in the present description blocks, components or identical or analogous modules are indicated in the figures with the same reference numbers.

Figure 1A:
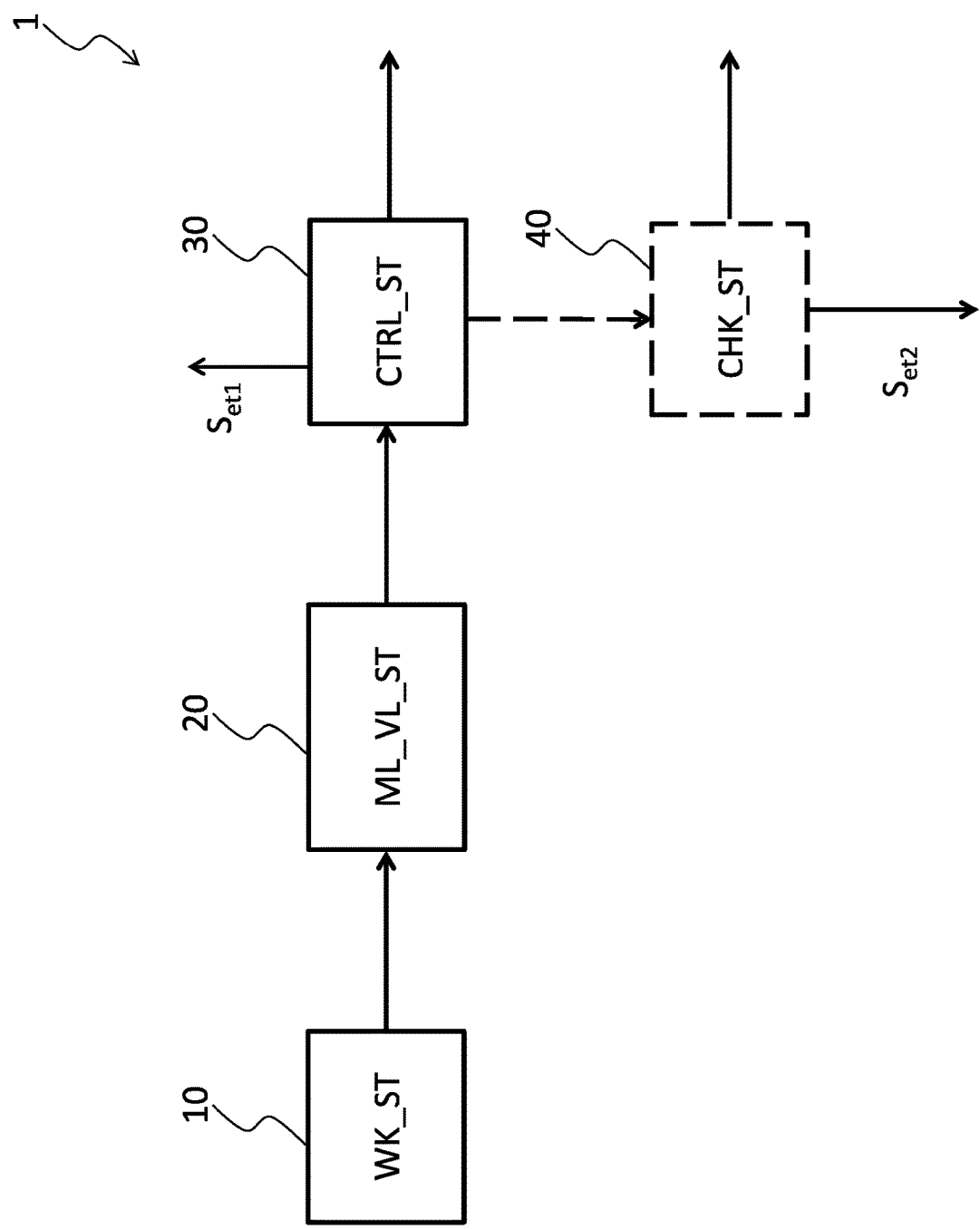
FIG. 1A-1B schematically show a tyre production line according to one embodiment of the invention.

With reference to FIG. 1A, a tyre production line 1 according to one embodiment of the invention is shown.

The production line 1 comprises a working station 10, a moulding and curing station 20, a control station 30 and, preferably, a verification station 40. The tyres are treated to a continuous cycle, by crossing in the order the working station 10, the moulding and curing station 20, the control station 30 and possibly also the verification station 40.

The working station 10 carries out a green tyre building operation.

The moulding and curing station 20 receives the green tyres from the working station 10 and then carries out an operation of moulding the tyre by means of moulds and subsequently carries out a curing operation, thus obtaining the finished tyres.

The control station 30 receives the finished tyres from the moulding and curing station 20 and carries out a control operation of the finished tyres in order to detect the presence of defects thereon, as will be explained more in detail hereinafter.

By defects of the tyre, it is intended defects that generate an alteration of the height profile of a surface of the tyre, such as:
bubbles;
cuts;
missing material (e.g. depressions);
bends;
openings.

Preferably, the control station 30 is such to generate a test result signal $S_{et1}$ indicating the result of the control operation on the finished tyres. For example, the test result signal $S_{et1}$ can assume the following values:
"good": it indicates that the analysed finished tyre is defect-free and thus it can be placed on the market;
"reprocess": it indicates that the finished tyre has a defect of small size, which can be corrected by means of a further processing and subsequently the tyre can be placed on the market;
"defective": it indicates that the finished tyre has a defect of considerable size, and thus it must be discarded and it can no longer be placed on the market.

If the test result signal $S_{et1}$ assumes a "good" value, the finished tyre advances in the production line 1 to a subsequent station; for example, the finished tyre is stored in a warehouse.

If the test result signal $S_{et1}$ assumes the "defective" or "reprocess" value, the finished tyre is unloaded from the control station 30 and it is loaded in the verification station 40.

Preferably, if the test result signal $S_{et1}$ assumes the "defective" or "reprocess" value, the control station 30 is such to generate an image (e.g. two-dimensional, i.e. a photo) which represents the portion of the tyre having said defect of small or considerable size. In this case, the production line 1 further comprises a screen for displaying the image of the defect.

The verification station 40 receives the finished tyres from the control station 30 which were considered defective and carries out a further operation of verifying the defective finished tyres, for example by means of a specialised operator. Preferably, the verification station 40 is such to generate a second test result signal $S_{et2}$ indicating the result of the control operation on the finished tyres. For example, the second test result signal $S_{et2}$ can assume the following values:
"good": it indicates that the analysed finished tyre is defect-free and thus it can be placed on the market;
"reprocess": it indicates that the finished tyre has a defect of small size, which can be corrected by means of a further processing and subsequently the tyre can be placed on the market;
"defective": it indicates that the finished tyre has a defect of considerable size, and thus it must be discarded and can no longer be placed on the market.

It is observed that the presence of the verification station 40, along with the presence of the working 10 and moulding/curing 20 stations, is not essential for the purpose of carrying out the invention. For example, the verification station 40 is not present and the tyres considered defective by the control station 30 are unloaded therefrom and are discarded.

Figure 1B:
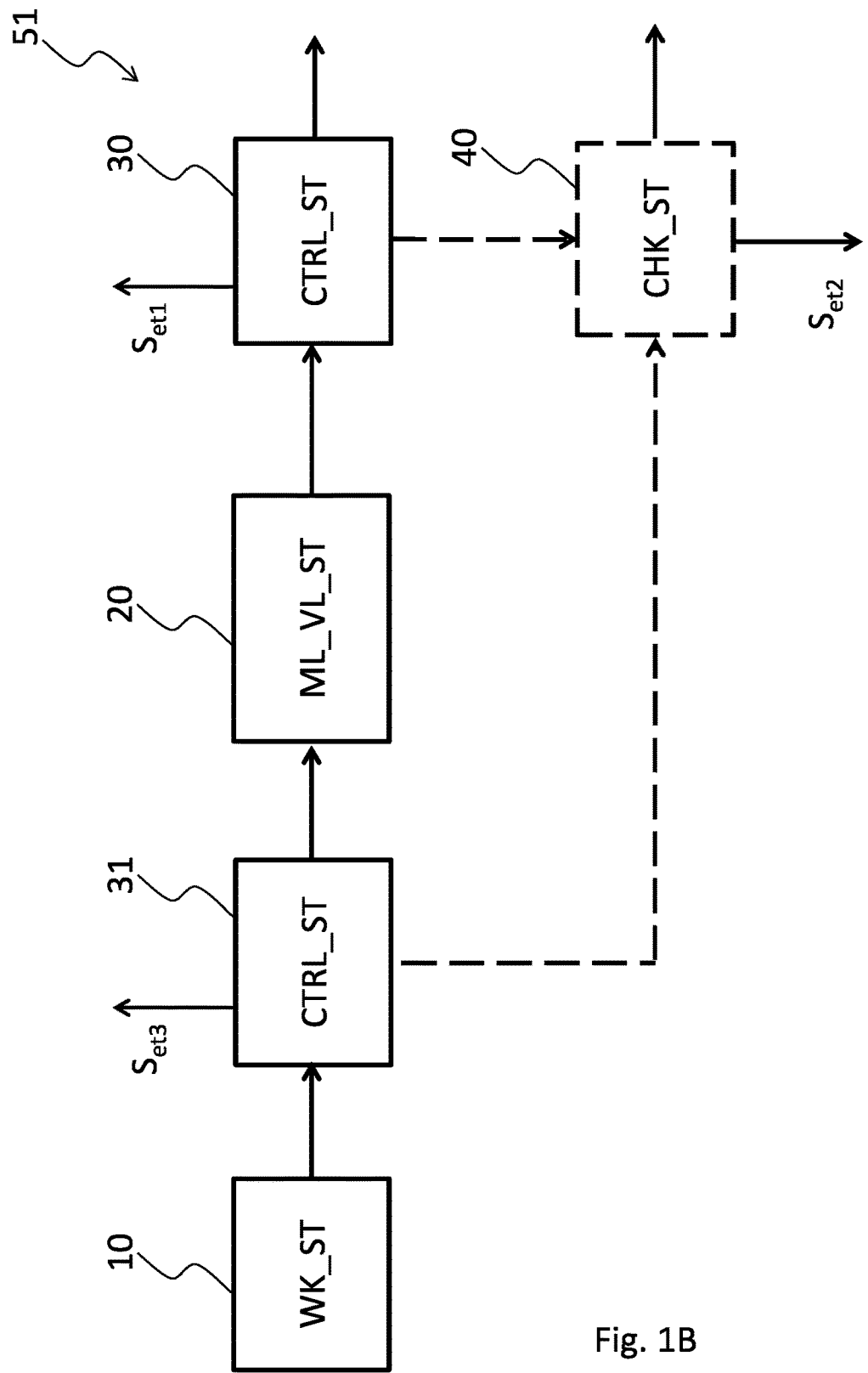

According to a variant of the embodiment of the invention shown in FIG. 1B, the production line 51 is such to further allow the control of the presence of defects on green tyres. In this case, the production line 51 comprises a second control station 31 interposed between the working station 10 and the moulding and curing station 20. The second control station 31 has a function similar to the one of the control station 30, with the difference that it is such to carry out the control of the presence of defects on green tyres rather than on finished tyres.

Figure 2:
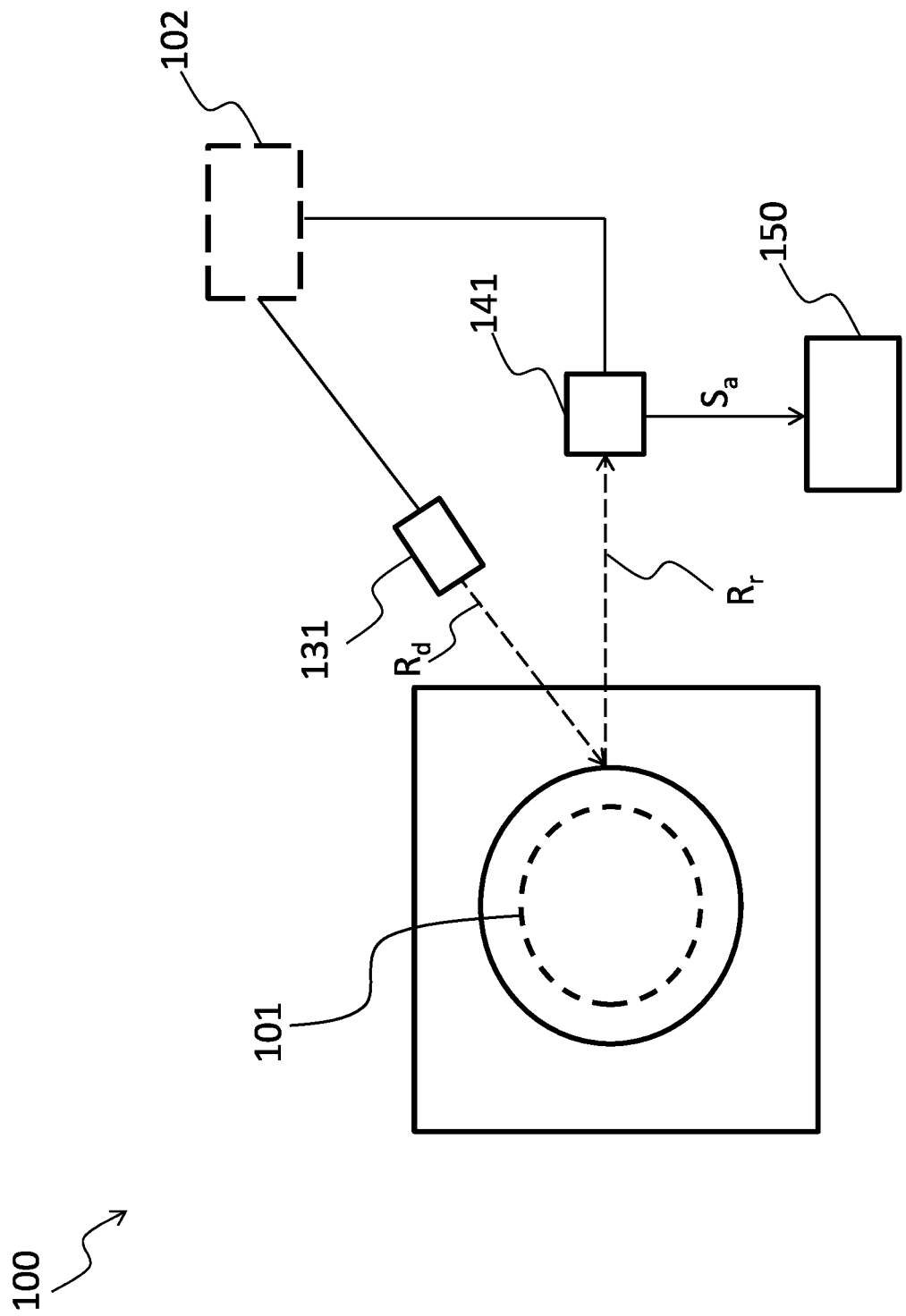
FIG. 2 shows a block diagram of an apparatus for detecting defects on the tyres in the tyre production line according to the embodiment of the invention.

The control station 30 comprises an apparatus 100 for detecting defects on finished tyres. In one embodiment, the apparatus 100 is shown in FIG. 2 with a block diagram.

The apparatus 100 comprises a support and movement member 101 having the function of supporting the finished tyre and rotating it around a rotation axis thereof.

The apparatus 100 also comprises a light source 131 and a camera 141.

The light source 131 is such to emit a light radiation $R_d$ for illuminating at least one portion of the surface of the finished tyre.

By portion of the surface of the finished tyre, it is intended for example:
- a portion of the carcass surface of the finished tyre;
- a portion of the surface of the bead of the finished tyre;
- a portion of the surface of a groove that extends around the rotation axis of the tyre along at least a part of the circumferential surface defined by the tread of the finished tyre;
- a portion of the surface of a block that extends around the rotation axis of the tyre along at least a part of the circumferential surface defined by the tread of the finished tyre and which does not have indentations;
- a portion of the substantially slick external circumferential surface of a finished tyre.

The emitted light radiation can be incoherent white light or coherent light with narrow band (e.g. a laser).

The camera 141 is such to acquire a three-dimensional image of the portion of the finished tyre illuminated by the light source 131, by means of the detection of the light radiation $R_r$ reflected by said portion. In particular, the camera 141 is such to generate an acquisition signal $S_a$ carrying values indicating the acquired three-dimensional image. More particularly, the acquired three-dimensional image is represented in digital form with a points matrix commonly indicated with pixels, each of which is characterised by the respective position in the matrix and by the intensity level of the gray (in the case of monochromatic images) or of the fundamental colours (in the case of colour images); in addition, each pixel is associated with a value indicating the height, with respect to a predefined reference, of the surface of said portion of the tyre represented by the considered pixel.

Advantageously, the apparatus 100 comprises a plurality of cameras for acquiring the three-dimensional image of a plurality of bands of the portion of the tyre: in this manner, the time spent for the acquisition of the images is reduced and it is possible to carry out the in-line control of the tyres. For example, such plurality of cameras can be arranged in line, to form an array of cameras side-by-side each other.

Preferably, the apparatus 100 further comprises a robotic arm 102 having a free end on which the light source 131 and the camera 141 are rigidly mounted.

Preferably, the apparatus 100 comprises a mirror having the function to allow the detection of the image of the carcass of the tyre, or of the internal surface of the finished tyre.

The apparatus 100 further comprises a processing unit 150 having the function of executing the control of the tyres for the purpose of detecting the presence of defects. The processing unit is for example a microprocessor.

In particular, the processing unit 150 is such to execute at least part of the method 200 for detecting defects on tyres in a tyre production process according to a first embodiment of the invention, as illustrated in the flow diagram shown in FIG. 3A (which will be illustrated more in detail hereinafter).

Alternatively or in combination, the processing unit 150 is such to execute at least part of the method 230 for detecting defects on tyres in a tyre production process according to a second embodiment of the invention, as illustrated in the flow diagram shown in FIG. 3B (which will be illustrated more in detail hereinafter).

Alternatively or in combination, the processing unit 150 is such to execute at least part of the method 250 for detecting defects on tyres in a tyre production process according to a third embodiment of the invention, as illustrated in the flow diagram shown in FIG. 3C (which will be illustrated more in detail hereinafter).

It is observed that the preceding considerations relating to the control station 30 are applicable in an analogous manner to the second control station 31, with the difference that the tyre to be analysed is green rather than finished. In particular, the second control station 31 also comprises an apparatus 100 to detect defects on green tyres and said apparatus 100 comprises a respective processing unit 150 which is such to execute at least a part of the method 200, 230 and 250.

Figure 3A:
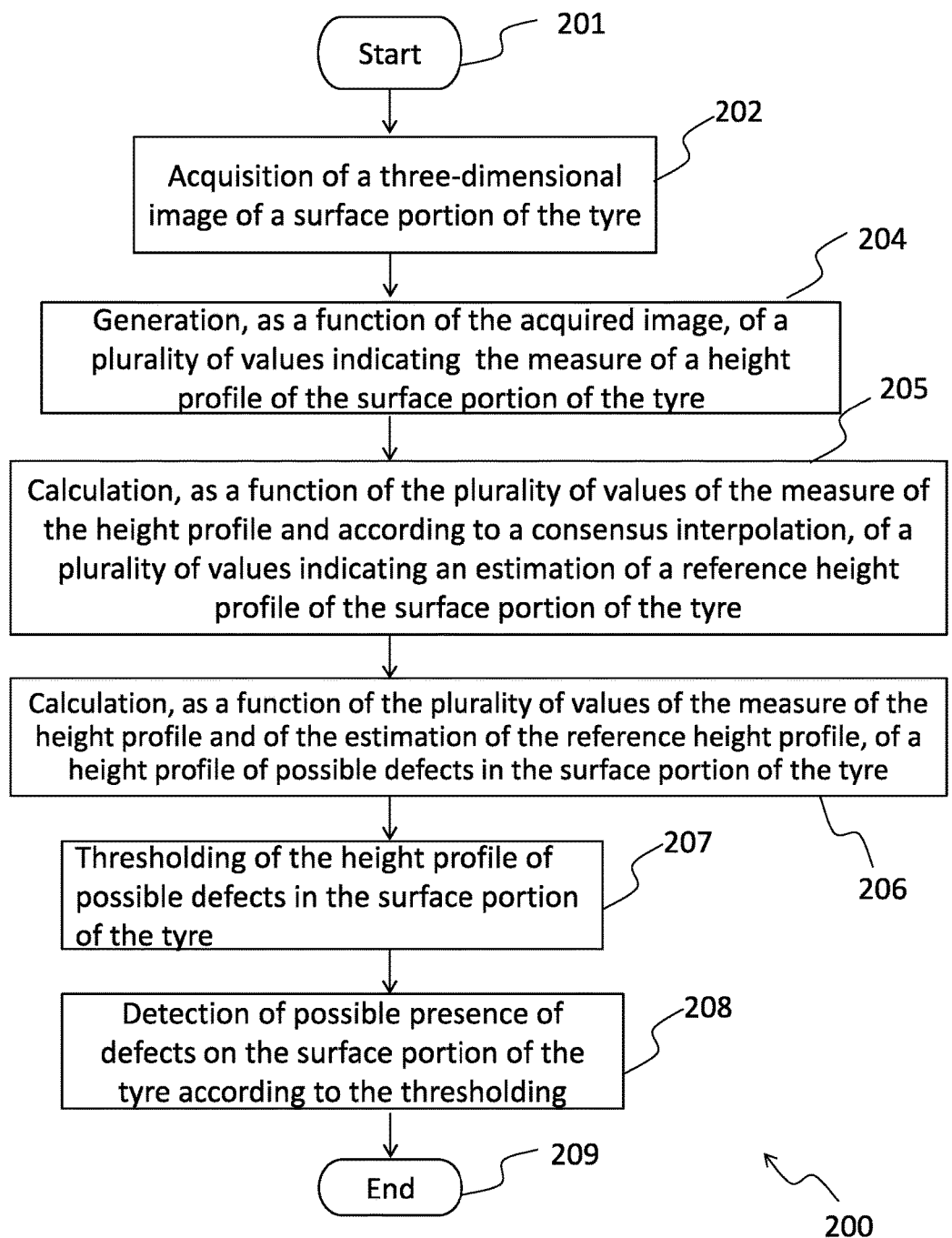
FIG. 3A-3C show the flow diagrams of the method executed by a processing unit of the apparatus to detect defects on the tyres according to a first, second and third embodiment of the invention.

With reference to FIG. 3A, it shows the flow diagram 200 of the method for detecting defects on tyres in a tyre production process according to a first embodiment of the invention. The method is run at least partly by the processing unit 150 of the apparatus 30, by means of a suitable software program.

The flow diagram 200 starts with step 201.

From step 201 it continues to step 202 wherein a three-dimensional image of a surface portion of the tyre is acquired.

From step 202 it continues to step 204 wherein it is generated, as a function of the acquired image, a plurality of values indicating the measure of a height profile of the surface portion of the tyre.

From step 204 it continues to step 205 wherein it is calculated, as a function of the plurality of values of the measured height profile and according to a consensus interpolation, an estimation of a reference height profile of the surface portion of the tyre. Between step 204 and step 205, a filtering (e.g. of Gaussian type) can be carried out of the values indicating the measure of the height profile of the surface portion of the tyre, in order to remove high-frequency noise from the measured height profile.

From step 205 it continues to step 206 wherein it is calculated, as a function of the plurality of values of the measure of the height profile and of values of the estimation of the reference height profile, a height profile of possible defects in the surface portion of the tyre is calculated.

From step 206 it continues to step 207 wherein it is carried out the thresholding of the height profile of possible defects in the surface portion of the tyre.

From step 207 it continues to step 208 wherein it is detected the possible presence of defects on the surface portion of the tyre according to said thresholding.

Figure 3B:
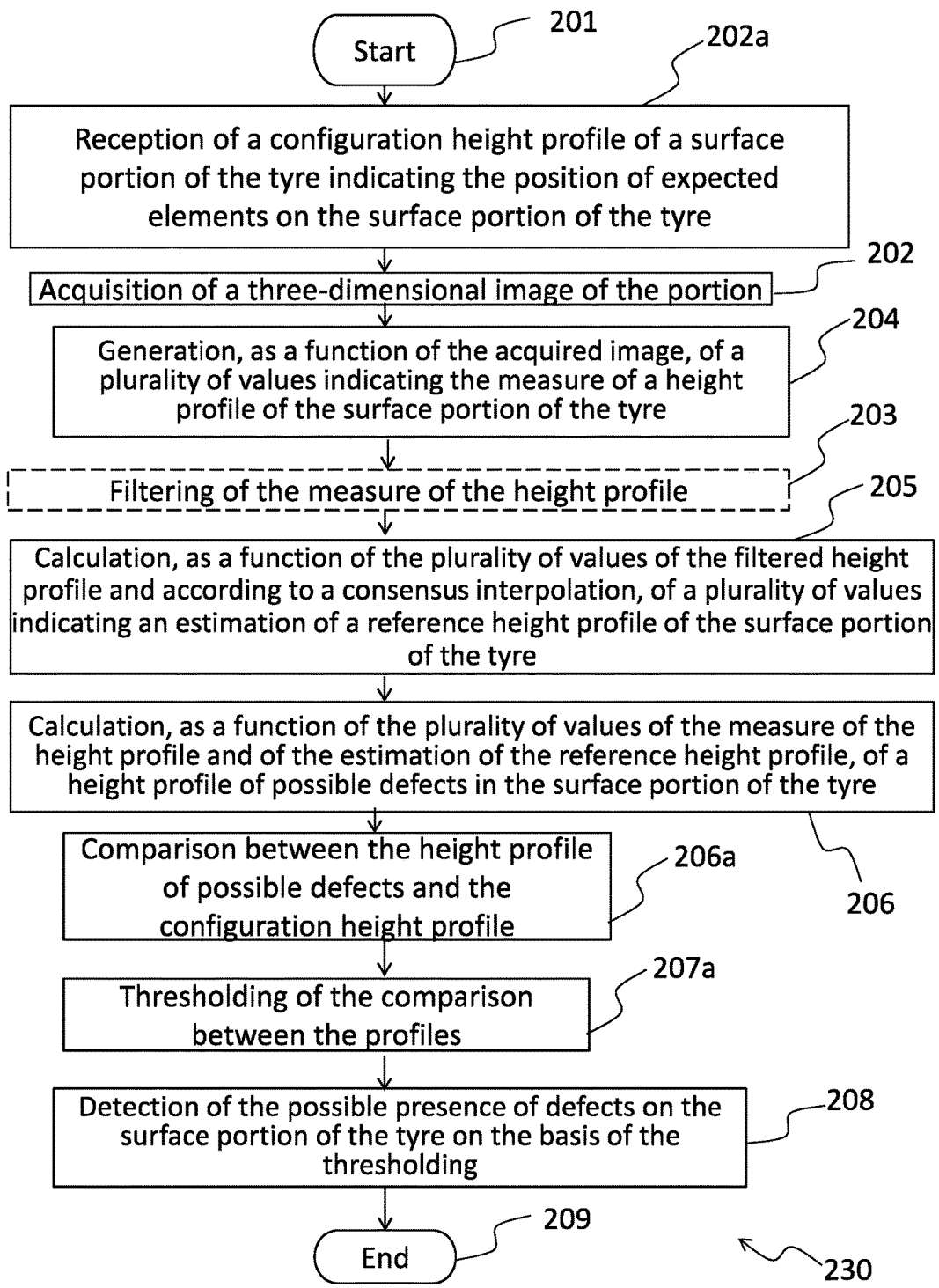

With reference to FIG. 3B, it shows the flow diagram 230 of the method for detecting defects on tyres in a tyre production process according to a second embodiment of the invention.

The flow diagram 230 allows to manage expected elements that are always positioned in the same position for a specific type of tyre.

The flow diagram 230 differs from the flow diagram 200 for the presence of the steps 202a, 203, 206a, 207a.

Step 202a is interposed between step 201 and 202. In step 202a it is received a configuration height profile of a portion of the tyre indicating the position of expected elements on the surface portion of the tyre.

The step 203 is interposed between the step 204 and 205; in step 203, a filtering (e.g. of Gaussian type) is carried out of the values indicating the measure of the height profile of the surface portion of the tyre, in order to remove high-frequency noise from the measured height profile.

The step 206a is subsequent to step 206. In step 206a, it is carried out the comparison (e.g. by means of a difference) between the height profile of possible defects and the configuration height profile, so as to eliminate the expected elements from the height profile of possible defects.

From step 206a it continues to step 207a wherein it is carried out the thresholding of the comparison between the profiles.

From step 207a it continues to step 208 wherein it is detected the possible presence of defects on the surface portion of the tyre according to said thresholding.

Figure 3C:
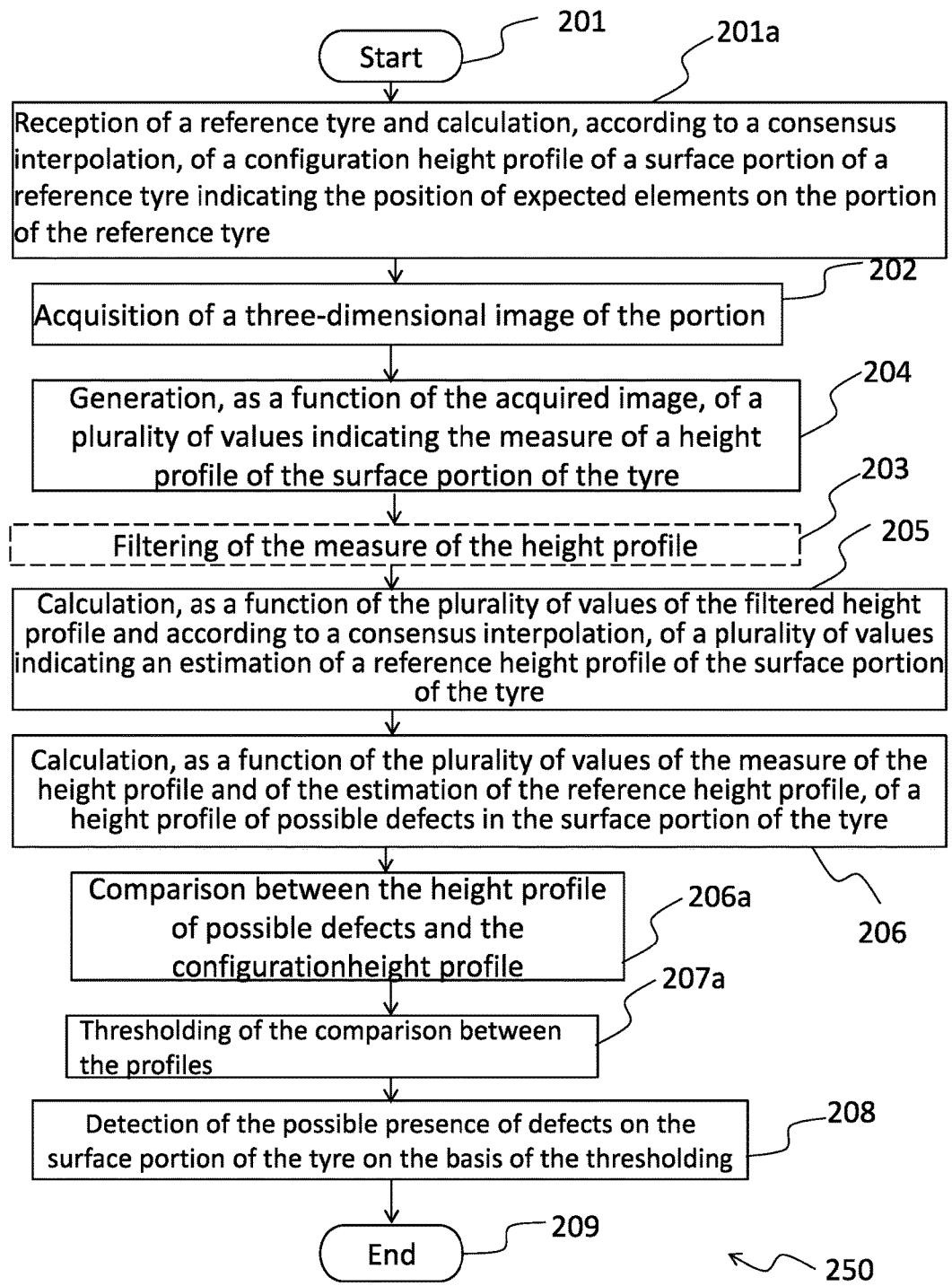

With reference to FIG. 3C, it shows the flow diagram 250 of the method for detecting defects on tyres in a tyre production process according to a third embodiment of the invention.

The flow diagram 250 allows to manage the expected elements which are not always positioned in the same position for a specific tyre type.

The flow diagram 250 differs from the flow diagram 200 for the presence of the steps 201a, 203, 206a, 207a.

The step 201a is interposed between the step 201 and 202. In step 201a it is received a reference tyre (i.e. defects-free) and it is calculated, according to a consensus interpolation, the configuration height profile of a portion of a reference tyre indicating the position of expected elements on the portion of the tyre. In particular, for the purpose of calculating the configuration height profile it is applied, on the defects-free reference tyre, the method of FIG. 3A wherein at the end of the step 208 the expected elements are detected as if they were defects that "survive" the thresholding carried out in the step 207.

Returning to FIG. 3C, the step 203 is interposed between the step 204 and 205; in step 203, a filtering is carried out (e.g. of Gaussian type) of the values indicating the measure of the height profile of the portion of the tyre for the purpose of removing the high-frequency noise from the measured height profile.

Step 206a is subsequent to step 206. In step 206a it is carried out the comparison (e.g. by means of a difference) between the height profile of possible defects and the calculated configuration height profile.

From step 206a it continues to step 207a wherein it is carried out the thresholding of the comparison between the profiles.

From step 207a it continues to step 208 wherein it is detected the possible presence of defects on the portion of the tyre according to said thresholding.

Figure 4A:
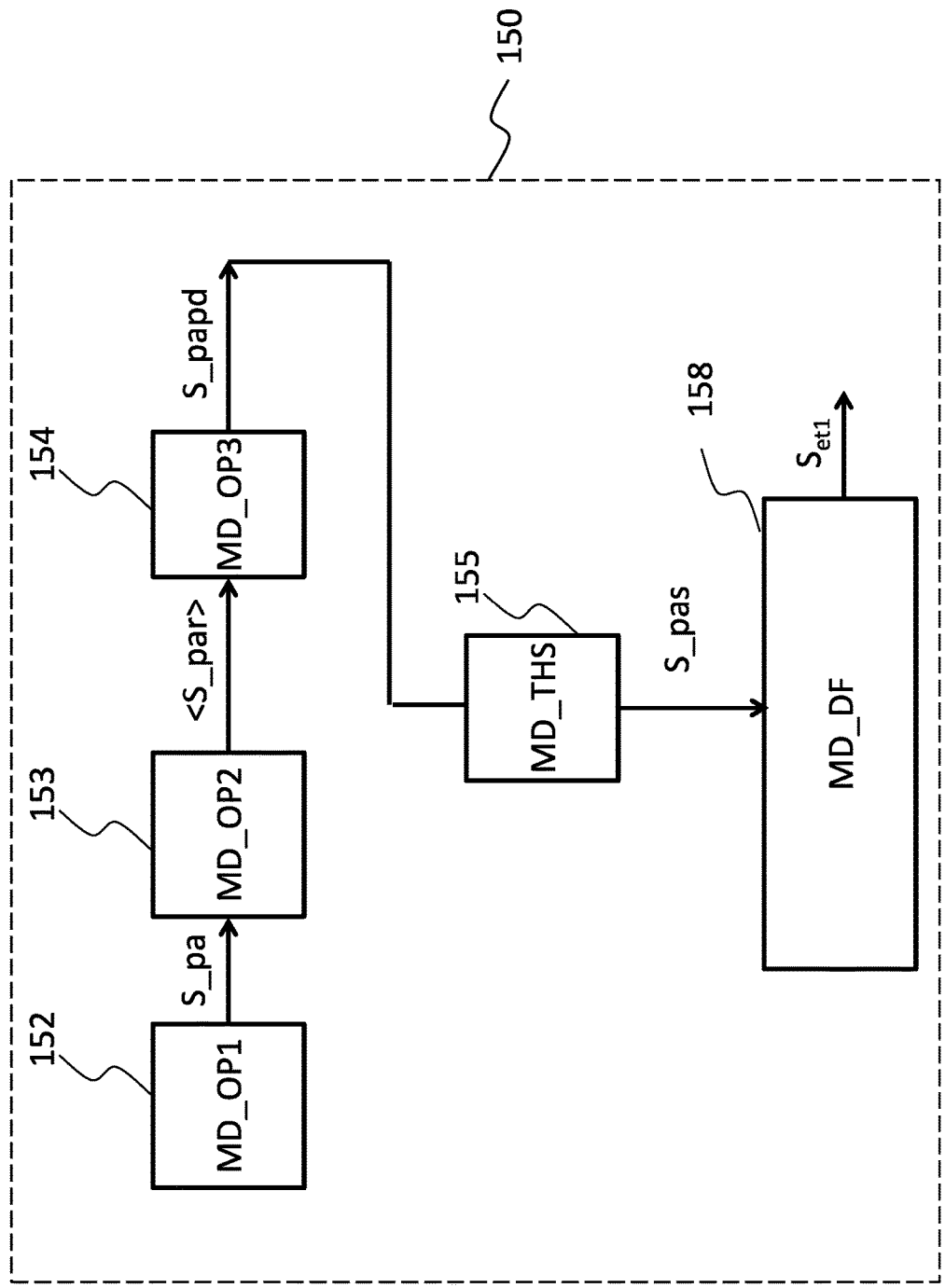
FIG. 4A-4C show in more detail the processing unit of the apparatus for detecting defects on the tyres according to a first, second and third embodiment of the invention.

With reference to FIG. 4A, it shows in more detail the processing unit 150 according to a first embodiment of the invention. The processing unit 150 comprises:

- a first operating module 152;
- a second operating module 153;
- a third operating module 154;
- a thresholding module 155;
- a defect detecting module 158.

The first operating module 152 is configured to generate, as a function of the acquired image, a plurality of values indicating the measure of a height profile S_pa of the surface portion of the tyre.

The second operating module 153 is configured to calculate, as a function of the plurality of values of the measured height profile S_pa and according to a consensus interpolation, an estimation <S_par> of a reference height profile of the surface portion of the tyre.

The third operating module 154 is configured to calculate, as a function of the plurality of values of the measure of the height profile S_pa and of values of the estimation of the reference height profile <S_par>, a height profile of possible defects S_papd in the surface portion of the tyre.

The thresholding module 155 is configured to generate a threshold height profile S_pas calculated by means of the thresholding of the height profile of possible defects S_papd in the surface portion of the tyre.

The defect detecting module 158 is configured to detect the possible presence of defects in the surface portion of the tyre as a function of the threshold height profile S_pas and to generate the test result signal $S_{et1}$ indicating the result of the control operation on the tyre.

Figure 4B:
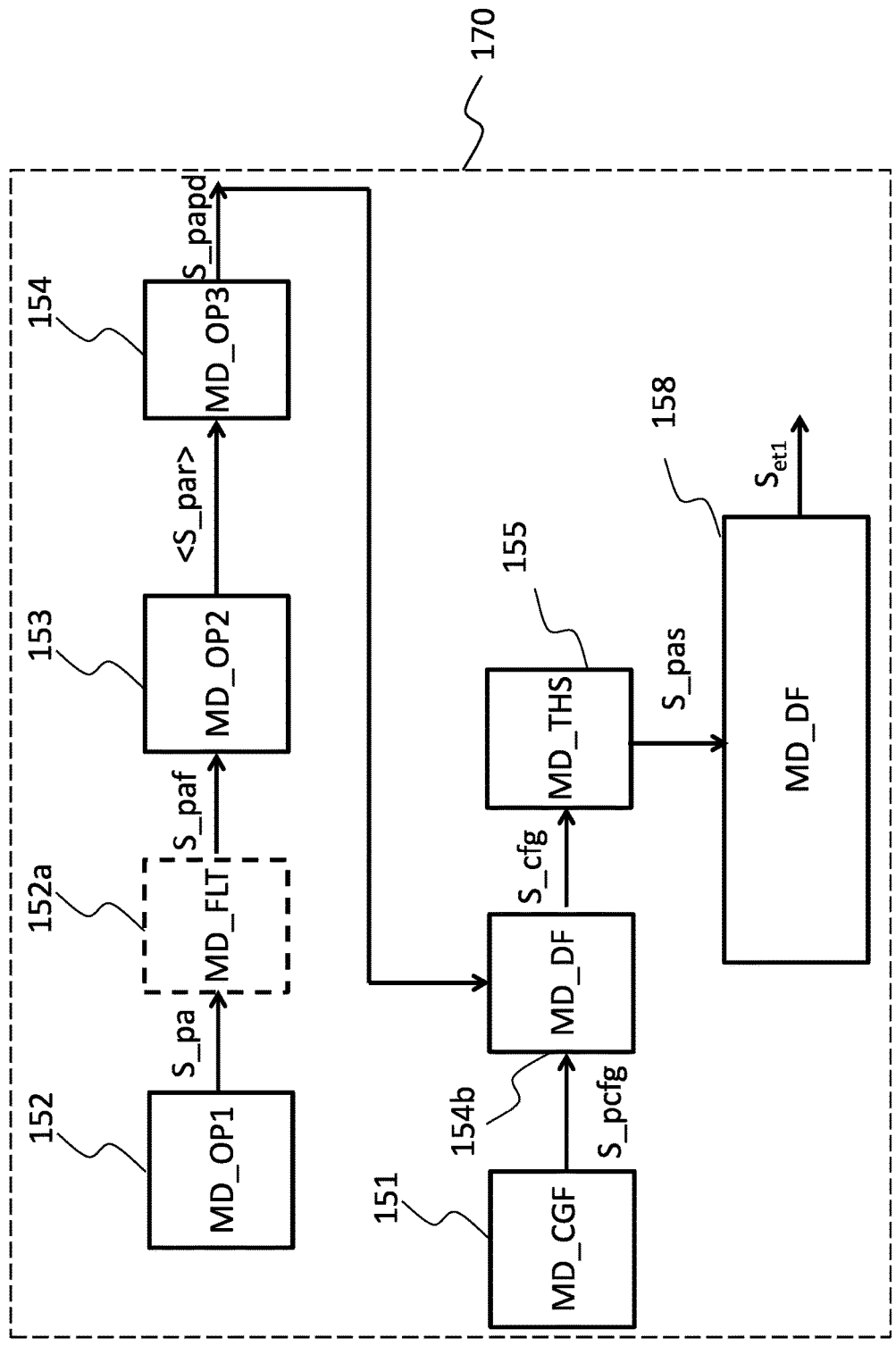

FIG. 4B shows the processing unit 170 according to a second embodiment of the invention. The processing unit 170 differs from the processing unit 150 in the further presence of a configuration module 151, a filtering module 152a and a comparing module 154b.

The configuration module 151 is configured to receive a configuration height profile S_pcfg of a portion of the tyre indicating the position of expected elements on the surface portion of the tyre.

The filtering module 152a is configured to carry out the filtering (e.g. of Gaussian type) of the data representative of the acquired image.

The comparing module 154b is configured to generate a comparison signal S_cfr indicating the comparison (e.g. by means of calculation of the difference) between the height profile of possible defects S_papd and the configuration height profile S_pcfg.

The thresholding module 155 is configured to generate the threshold height profile calculated by means of the thresholding of the comparison signal S_cfr.

Figure 4C:
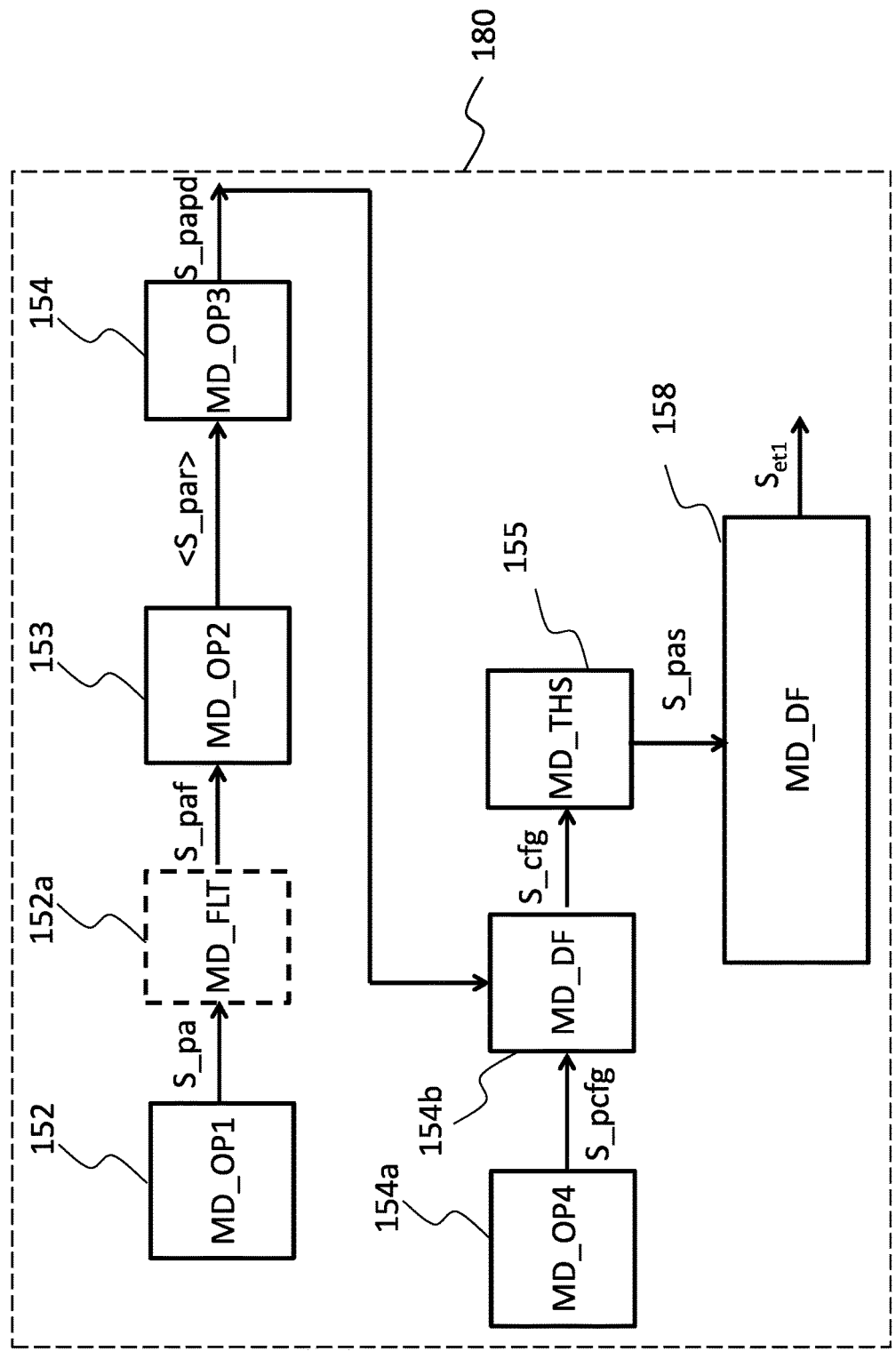

FIG. 4C shows the processing unit 180 according to a third embodiment of the invention. The processing unit 180 differs from the processing unit 150 in the further presence of a fourth operating module 154a, a filtering module 152a and the comparing module 154b.

The fourth operating module 154a is configured to calculate, according to a consensus interpolation, the configuration height profile S_pcfg of a portion of a reference tyre (i.e. defects-free) indicating the position of expected elements on the portion of the reference tyre.

The filtering module 152a is configured to carry out the filtering (e.g. of Gaussian type) of the representative data of the acquired image.

The comparing module 154b is configured to generate the comparison signal S_cfr indicating the comparison (e.g. by means of calculation of the difference) between the height profile of possible defects S_papd and the configuration height profile S_pcfg.

The thresholding module 155 is configured to generate the threshold height profile S_pas calculated by means of the thresholding of the comparison signal S_cfr.

The use of consensus algorithms is particularly advantageous with respect to the use of other interpolation algorithms, such as linear regression and moving average (the latter used in WO 2012-143197). For example, the RANSAC algorithm performs a linear interpolation of a plurality of values corresponding to the points of the considered portion of the tyre. As explained above, said linear interpolation is optimal with respect to most of the values, which correspond to the points of the considered portion that does not have the defect, because most of the values that correspond to points of the considered portion having the defect are discarded by the algorithm itself. In this manner, it is possible to correctly detect the reference height profile, and thus the presence of a defect with respect to such reference height profile. Moreover, it is possible to detect the size of the defect in its entirety, i.e. if this is a serious defect or a less serious defect.

Differently, the linear regression and moving average perform a linear interpolation which comprises all the values of the considered portion, also including the values that correspond to the points representative of the defect: in this way it is not always possible to detect the presence of the defect, and even if this is possible, it is not possible to detect the size of the defect in its entirety, i.e. it is not possible to identify if it is a serious defect or a less serious defect.

The use of consensus interpolation algorithms does not add further complexity of calculation and/or of input/output data. For example, the input parameters for the RANSAC algorithm can be the following:
  data: values of the measure of the height profile;
  max_iterations: maximum number of iterations executed by the RANSAC algorithm;
  n: minimum number of data for which it is required to fit the model (for example, n=2 in the case of a straight line);
  epsilon: maximum distance of the data from the model in order to give consensus (i.e. for determining when a data belongs to the model);
  sufficient_consensus: number of points sufficient for asserting that the found model fits well to the data.

The parameters provided at the output of the RANSAC algorithm can be the following:
  best_model: straight line which best fits the data;
  best_consensus: number of points which are in accordance with the best_model (i.e. with the straight line).

Assuming, for the sake of simplicity, the use of the input parameter n=2, one example of RANSAC algorithm can execute the following steps:
a) two values of the measure of the height profile are randomly selected and it is calculated the straight line passing through two points corresponding to said two values;
b) it is calculated the number of values of the height profile measure which are located in the proximity (by means of the epsilon input parameter) of said straight line and said number of values is stored;
c) steps a) and b) are repeated, randomly selecting two other points and calculating other straight lines;
d) the iterations terminate when a sufficient number of values of the height profile measure is located in the proximity of the calculated straight line (for example, the value of the sufficient_consensus is comprised between 80% and 90% of the points of the acquired data) or when the maximum number of iterations has been reached.

It is observed that the preceding example can be generalised to the case wherein the interpolation is not carried out by using a straight line as a model, but another line as model is used, such as a parabola or a spline: in this case, a value of n is used that is greater than 2.

Figure 5A:
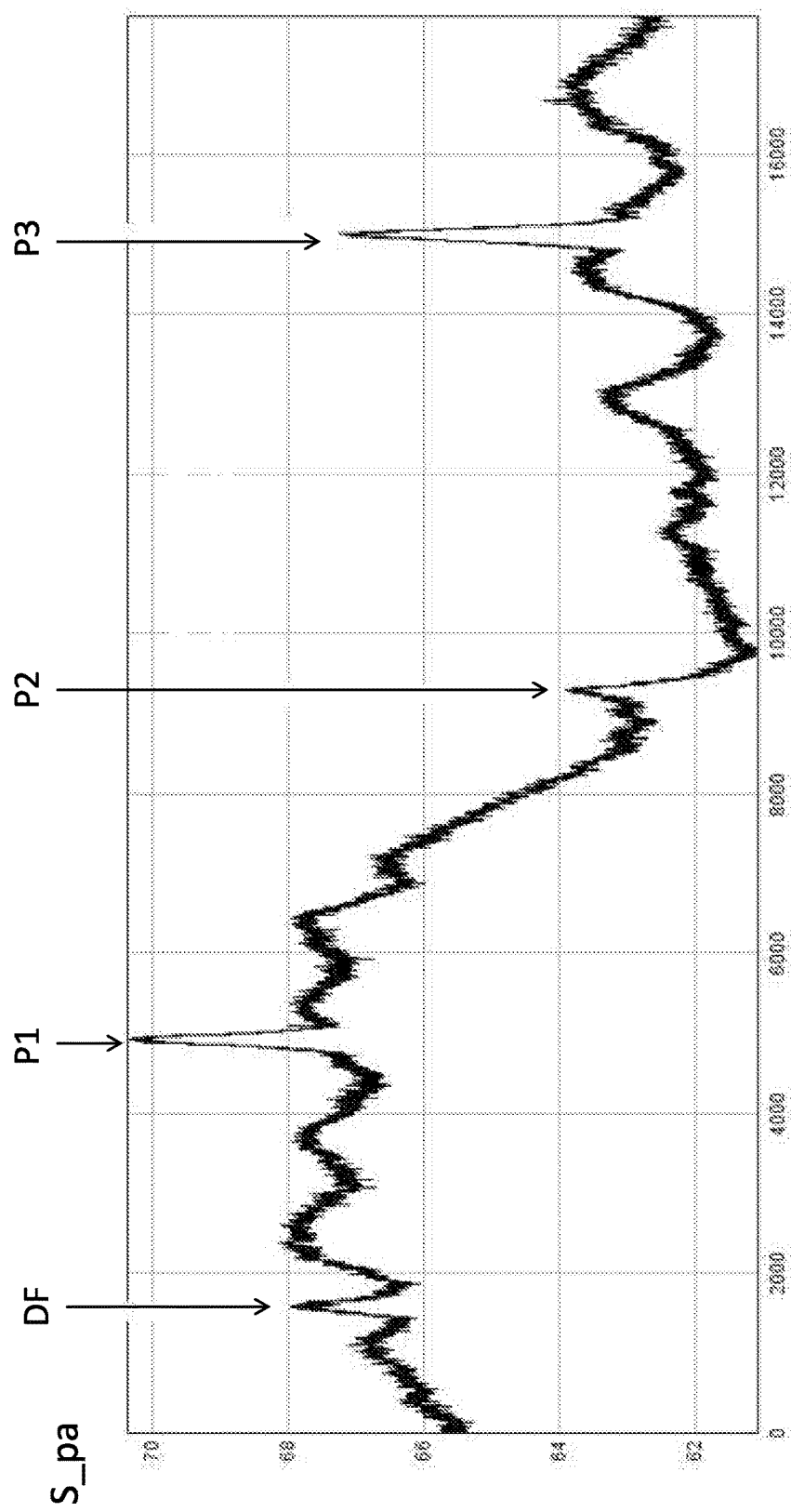
FIG. 5A-5B show the measured height profile of the surface of the carcass of a tyre and the height profile of possible defects of the surface of the carcass of the same tyre respectively.
Figure 5B:
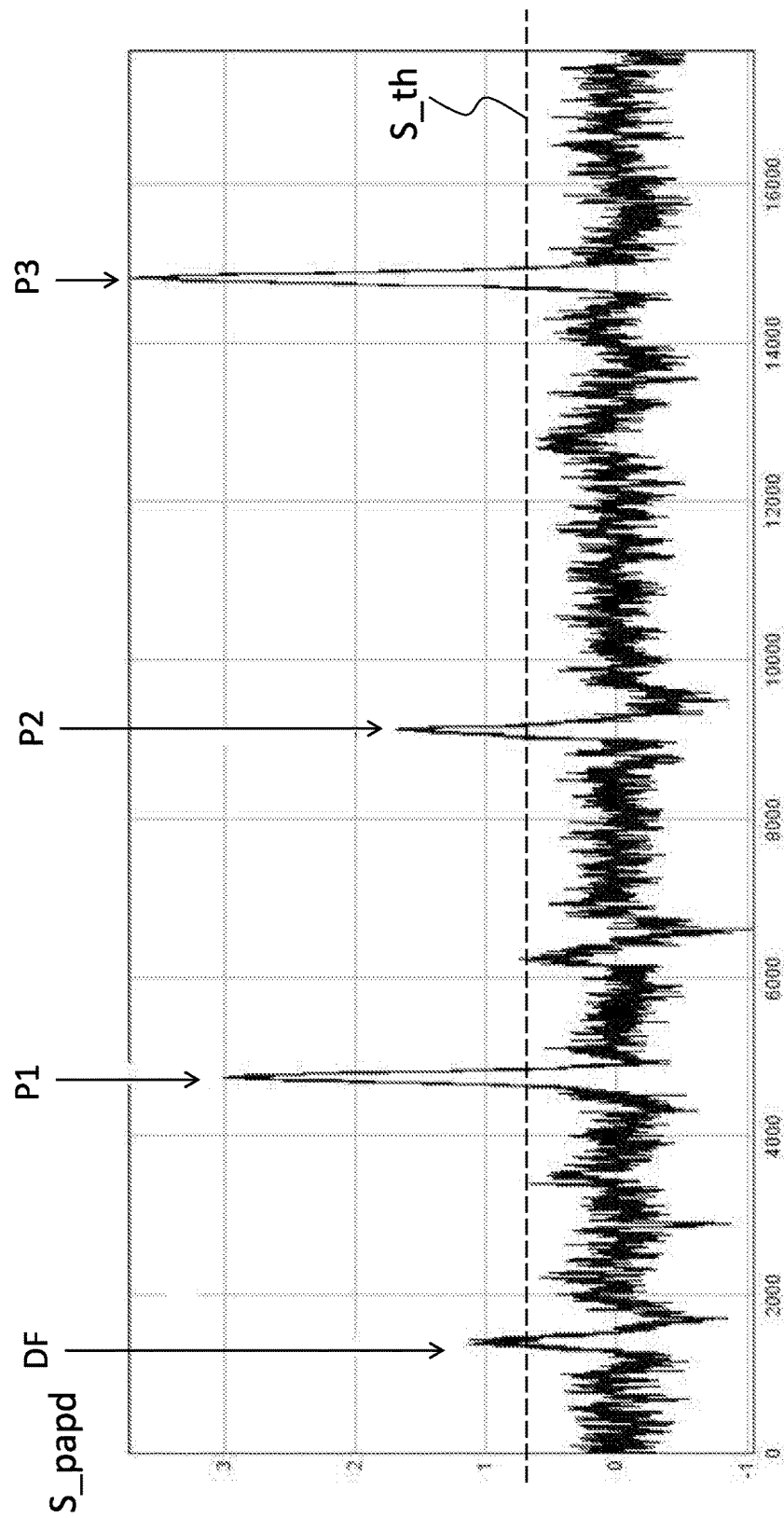

Referring to FIG. 5A-5B, it is shown the measure of the height profile S_pa of the carcass surface of a tyre and the height profile of possible defects S_papd of the carcass surface of the same tyre respectively, the latter being calculated with the method according to the invention. In both cases, it is shown the profile of a considered band extending around the rotation axis of the tyre along the entire circumferential carcass surface of the tyre, i.e. along 360°.

On the abscissa axis of FIG. 5A-5B it is indicated the distance along the circumferential surface with respect to a reference point placed on the considered band; in particular, the values of the abscissas represent the pixels of the considered band.

On the ordinate axis of FIG. 5A-5B it is indicated the relative and absolute value of the measured height profile S_pa and the height profile of possible defects S_papd, respectively, expressed in millimeters.

In order to be able to evaluate the effectiveness of the method according to the invention, a tyre is considered wherein the presence of a defect DF on the surface of the carcass is known (for example, the defect is a bubble) and wherein it is known the presence of three expected elements indicated with P1, P2, P3, as shown in FIG. 5A. For example, P1 is a "building ply joint", P2 is a "preparation ply joint" and P3 is a "liner joint".

It is possible to observe in FIG. 5A that the radial variation of the carcass surface of the tyre is non-negligible and is of the same order of magnitude of the defect DF and in some cases even of the expected elements (for example, P2).

The height profile of possible defects S_papd of the surface of the carcass shown in FIG. 5B was calculated with the method according to the invention described with reference to FIG. 3A.

It is possible to observe in FIG. 5B that the radial variation of the surface of the carcass was mostly removed and thus the defect DF and the expected elements P1, P2, P3 of the carcass surface of the tyre are better recognised. By means of thresholding, it is possible to recognise the defect DF and the expected elements P1, P2, P3. As explained above, such expected elements can be removed (and thus not be considered defects) by means of providing or calculating a configuration height profile that provides for them.

It will be described hereinafter the operation of a tyre production line 1 according to an embodiment of the invention, making also reference to FIGS. 1A, 2, 3A, 4A. For the purpose of explaining the invention, it is assumed to analyse the carcass of a tyre that has a defect; more particularly, for the sake of simplicity, it is assumed to acquire the three-dimensional image of only one band of the carcass, wherein the band extends around the rotation axis of the tyre along the entire circumferential surface of the carcass.

It is also assumed to use only one camera 141 and an illuminator 131 for acquiring the images of the tyre to be controlled, mounted on a robotic arm 102 capable of being introduced inside the cavity of the tyre.

Finally, it is assumed to use the consensus interpolation of RANSAC type.

When the working station 10 has completed the building of a green tyre, the moulding and curing station 20 receives the green tyre and starts carrying out the moulding and curing of the tyre.

In such a manner, the finished tyre is thus generated.

The control station 30 receives the finished tyre at the output of the moulding and curing station 20 and starts controlling the finished tyre in order to detect the presence of the defect on the carcass.

In particular, the tyre to be controlled is abutted against the support and movement member 101 and starts to be rotated around its rotation axis; simultaneously, the light source 131 generates the light radiation $R_d$ which illuminates a band of the carcass of the tyre, thus the camera 141 receives the radiation reflected from the band and acquires the three-dimensional image of the band of the carcass while the tyre carries out a complete rotation around its rotation axis.

The processing unit 150 processes the acquired three-dimensional image of the band of the carcass and generates therefrom measures of a plurality of height profiles S_pa1', S_pa2', ... S_pan' corresponding to a plurality of arc-shaped sections of the band, wherein contiguous arc-shaped sections are overlapped in the circumferential direction.

In particular, the processing unit 150 calculates, as a function of the values of the measure of a first height profile S_pa1' and according to the consensus interpolation of RANSAC type, the values of the estimation of a first reference height profile of the first arc-shaped section of the band of the carcass.

The processing unit 150 then generates a first height profile of possible defects S_papd1' by means of the difference between the values of the measure of the first height profile S_pa1' and the values of the estimation of the first reference height profile.

In an analogous manner, the processing unit 150 calculates, as a function of the values of the measure of a second height profile S_pa2' and according to a consensus interpolation of RANSAC type, the values of the estimation of a second reference height profile of the second arc-shaped section of the band of the carcass, and generates a second height profile of possible defects S_papd2'.

The preceding operations are repeated by the processing unit 150 for all the further arc-shaped sections of the band of the carcass, so as to generate height profiles of possible defects for all the arcs, as well as an overall height profile of possible defects S_papd' as sum of the first height profile of possible defects S_papd1, the second height profile of possible defects S_papd2, ..., and the n-th height profile of possible defects S_papdn.

Finally, the processing unit 150 carries out the comparison between the values of the overall height profile of possible defects S_papd' with respect to the threshold value S_th, detecting that the value/values corresponding to the defect is/are greater than the threshold value S_th, and generates the test result signal $S_{et1}$ indicating that the tyre is defective.

It is observed that for the sake of simplicity, the operation was illustrated relating to only one band of the carcass, but more generally the width of the surface of the carcass is subdivided into a plurality of bands. In this case, a complete rotation of the tyre around its rotation axis is carried out and at the end of the rotation, the three-dimensional image of all bands of the carcass is acquired. Subsequently, the processing unit 150 effects the processing of the acquired three-dimensional image and generates therefrom a plurality of images, each corresponding to a band. Subsequently, for each image of a band, the processing unit 150 performs the processing as illustrated above. Alternatively, the calculation can be carried out in parallel by means of a plurality of cameras 141.

Naturally, such example can be generalised to the analysis of any portion of the internal or external surface of the finished tyre and/or green tyre.

The invention claimed is:

1. A method for detecting defects on a tyre in a tyre production process, comprising:
   a) providing a tyre;
   b) acquiring a three-dimensional image of a surface portion of the tyre;
   c) generating, as a function of the acquired image, a plurality of values indicating a measure of a height profile of the surface portion of the tyre;
   d) interpolating the plurality of values of the measure of the height profile and using a consensus interpolation algorithm to generate a line indicating an estimation of a reference height profile of the surface portion of the tyre;
   e) calculating, as a function of the plurality of values of the measure of the height profile and of the estimation of the reference height profile, a height profile of possible defects in the surface portion of the tyre; and
   f) comparing values of the height profile of possible defects with respect to a threshold value to detect possible defects in the surface portion of the tyre.

2. The method according to claim 1, wherein said portion of the tyre extends along at least a part of a circumferential surface of the tyre around a rotation axis thereof, and wherein the method further comprises:
   subdividing said tyre portion into a plurality of arc-shaped sections;
   subdividing said three-dimensional image into a plurality of three-dimensional images corresponding to said plurality of arc-shaped sections; and
   iteratively repeating from c) to e) so as to generate a plurality of height profiles of possible defects corresponding to said plurality of arc-shaped sections.

3. The method according to claim 2, further comprising generating said height profile of possible defects as a function of said plurality of height profiles of possible defects corresponding to said plurality of arc-shaped sections.

4. The method according to claim 1, further comprising:
   subdividing said portion of the tyre into a plurality of substantially annular bands having a substantially constant width; and
   repeating from b) to f) for each band of the plurality of bands.

5. The method according to claim 4, wherein two contiguous bands are at least partially circumferentially overlapped on each other.

6. The method according to claim 1, further comprising:
   receiving a configuration height profile of a portion of the tyre indicating a position of expected elements on the portion of the tyre; and
   comparing the height profile of possible defects with respect to the configuration height profile, so as to remove said expected elements from the height profile of possible defects.

7. The method according to claim 6, further comprising:
   receiving a reference tyre substantially defect-free and calculating, by means of from b) to f), said configuration height profile, wherein said expected elements are detected as defects on said reference tyre.

8. A non-transitory computer readable medium having a program comprising software code portions adapted to perform at least c), d), e), f) of the method according to claim 1, when said program is run on at least one computer.

9. A process for producing tyres, comprising:
   building green tyres;
   moulding and curing the green tyres; and
   controlling the green and/or cured tyres according to the method of claim 1.

10. The method according to claim 1, wherein the consensus interpolation algorithm is chosen from:
    RANdom SAmple Consensus—RANSAC;
    PROgressive SAmple Consensus—PROSAC;
    randomized RANSAC;
    progressive RANSAC;
    Maximum Likelihood EStimation SAmple Consensus—MLESAC;
    Maximum A Posteriori EStimation SAmple Consensus—MAPSAC;
    N Adjacent Points random consensus—NAPSAC;
    IMPortance SAmpling Consensus—IMPSAC; and
    robust filtering by consensus—KALMANSAC.

11. The method according to claim 10, wherein the consensus interpolation is of RANdom SAmple Consensus—RANSAC type.

12. An apparatus to detect defects on a tyre in a tyre production line, comprising:
    a support and movement member having a support adapted to support a tyre and to rotate said tyre around a rotation axis thereof;
    a light source configured to emit a light radiation for illuminating a portion of the surface of the tyre during rotation thereof;
    at least one camera configured to acquire a three-dimensional image of the surface portion of the tyre during rotation thereof; and
    a processing unit configured to:
        generate, as a function of the acquired image, a plurality of values indicating a measure of a height profile of the surface portion of the tyre;
        interpolate the plurality of values of the measure of the height profile and using a consensus interpolation algorithm, to generate a line indicating an estimation of a reference height profile of the surface portion of the tyre;
        calculate, as a function of the plurality of values of the measure of the height profile and of the estimation of the reference height profile, a height profile of possible defects in said surface portion of the tyre; and
        compare values of the height profile of possible defects with respect to a threshold value to detect possible defects in the surface portion of the tyre.

13. A tyre production line, comprising:
    a working station;
    a moulding and curing station; and
    a control station comprising an apparatus to detect defects on tyres according to claim 12.

14. The apparatus according to claim 12, wherein the processing unit is configured to interpolate the plurality of valves of the measure of the height profile using the consensus interpolation algorithm chosen from:
    RANdom SAmple Consensus—RANSAC;
    PROgressive SAmple Consensus—PROSAC;
    randomized RANSAC;
    progressive RANSAC;
    Maximum Likelihood EStimation SAmple Consensus—MLESAC;
    Maximum A Posteriori EStimation SAmple Consensus—MAPSAC;
    N Adjacent Points random consensus—NAPSAC;
    IMPortance SAmpling Consensus—IMPSAC; and
    robust filtering by consensus—KALMANSAC.

15. The apparatus according to claim 14, wherein the consensus interpolation is of RANdom SAmple Consensus—RANSAC type.

* * * * *